(12) United States Patent
Roter

(10) Patent No.: US 12,387,592 B2
(45) Date of Patent: Aug. 12, 2025

(54) METHOD FOR TRANSMITTING METROLOGICAL DATA AND DEVICE IMPLEMENTING THE METHOD

(71) Applicant: SAGEMCOM ENERGY & TELECOM SAS, Rueil Malmaison (FR)

(72) Inventor: Ziv Roter, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 183 days.

(21) Appl. No.: 17/893,894

(22) Filed: Aug. 23, 2022

(65) Prior Publication Data
US 2023/0064062 A1 Mar. 2, 2023

(30) Foreign Application Priority Data
Aug. 31, 2021 (FR) ...................................... 2109060

(51) Int. Cl.
*G08C 19/00* (2006.01)
(52) U.S. Cl.
CPC .................................... *G08C 19/00* (2013.01)
(58) Field of Classification Search
CPC ......... G08C 19/00; Y04S 20/30; H04L 67/34; H04L 67/5651; H04L 67/12
See application file for complete search history.

(56) References Cited

U.S. PATENT DOCUMENTS

| | | | | |
|---|---|---|---|---|
| 5,757,795 A * | 5/1998 | Schnell | ............... | H04L 49/9031 711/216 |
| 2004/0139322 A1 * | 7/2004 | Kaler | ..................... | H04L 67/34 709/228 |
| 2011/0303311 A1 * | 12/2011 | Klicpera | ............. | G01F 15/0755 137/551 |
| 2012/0137350 A1 * | 5/2012 | Ju | ......................... | H04L 9/0643 726/6 |
| 2016/0076909 A1 * | 3/2016 | Klicpera | ............. | G01F 15/0755 73/198 |
| 2016/0182233 A1 * | 6/2016 | Go | ....................... | H04L 12/2816 380/255 |
| 2017/0265268 A1 | 9/2017 | Couch et al. | | |
| 2018/0128437 A1 | 5/2018 | Coombes et al. | | |
| 2018/0309818 A1 * | 10/2018 | Park | .................... | H04L 41/0853 |

FOREIGN PATENT DOCUMENTS

JP 2006-277378 A 10/2006
WO WO-2021113691 A1 * 6/2021 ............. G01D 4/004

OTHER PUBLICATIONS

Mar. 16, 2022 Search Report issued in French Patent Application No. 2109060.

\* cited by examiner

*Primary Examiner* — Rufus C Point
(74) *Attorney, Agent, or Firm* — Williams Mullen; R. Brian Drozd

(57) ABSTRACT

A method for transmitting metrological data from a measuring device and to a collecting server, implemented in the measuring device configured for converting a physical quantity into metrological data, includes: detecting a modification of the configuration of the measuring device, in relation to metrological data to be transmitted; determining a series of information representing a transmission format of said metrological data to be transmitted; determining a hash code of the information representing the transmission format; sending, to the collecting device, the hash code and then the metrological data to be transmitted.

9 Claims, 5 Drawing Sheets

METHOD FOR TRANSMITTING METROLOGICAL DATA AND DEVICE IMPLEMENTING THE METHOD

TECHNICAL FIELD

The present invention relates to the transmission of data between an electronic measuring device and a remote collecting server. The invention relates more particularly to a method for transmitting data from a smart water, gas or electricity consumption meter and a server collecting such consumption data.

PRIOR ART

Many connected objects are designed and configured for communicating with each other and exchanging data in the context of various applications. The communication systems enabling two connected objects to communicate with each other are many. It may be a case of systems according to a so-called "proprietary" format or systems using physical supports and standardised protocols, or a combination of the two. To facilitate communication between connected objects via one or more communication networks, numerous protocols are defined, making it possible in particular for a connected device receiving data from another connected device to be able to read, interpret and process these data, where applicable. Numerous applications exist according to which measuring devices are configured for generating metrological data and next transmitting them to one or more remote devices for collecting these data, with a view to processing. This is the case, for example, with devices of the smart meter type that are designed and configured for measuring physical quantities such as for example a flow of electric current (electrical consumption), a flow of water or a flow of gas (fluid consumption), and then for transmitting, at regular intervals or not, metrological data representing consumption, to a collecting server. These metrological data, representing consumption, are transmitted to a collecting server with a view to later, for example, performing operations of analysing consumption requirements and invoicing operations. Such smart meters may be configured in many configurations, in particular because of the variety of commercial and tariff offers liable to be proposed, or because of a change in subscription to an electricity, water or gas supply service, for example, or according to the type of measuring device used. In some configurations, measuring devices, such as smart consumption meters, transmit metrological data to a collecting server spontaneously, i.e. without the collecting server having had to seek reception of these data. Such a data transmission is normally referred to as transmission in "push" mode, since it is considered in such cases that the measuring device "pushes" the data to the remote collecting server designed to receive and process them, without any explicit demand having to be made by the collecting server.

This transmission mode is opposite to the so-called "pull" mode, where the collecting server sends, for example, a request to the measuring device with a view to obtaining metrological data, or more generally reads metrological data that are available therein. However, because of the great variety of configuration of measuring devices, for example of the smart consumption meter type, the collecting server receiving data can know the format of the data received only by means of a description of the format of the metrological data transmitted, transmitted prior to the data themselves. Such a description of the format of the useful metrological data received is often instantiated in the form of additional data known as metadata. These metadata are made from a series of information representing the format of metrological data transmitted and preceding the useful metrological data, during a transmission between a measuring device and a collecting server device. These metadata are often encoded according to reference standards, so that, by decoding the metadata, or more generally by reading and interpreting them, a collecting server device can know the format of the useful metrological data that will follow and consequently read them in a known order, and then interpret them correctly, with a view to subsequent processing.

However, such metadata used as a description of the format of the useful metrological data are often very numerous, so that the volume of metadata to be transmitted is sometimes greater or even much greater than the volume of the useful metrological data, whereas the configuration of a measuring device, and consequently the format of the useful metrological data, changes only rarely. The result is unnecessary consumption of bandwidth on the communication network or networks used for transmitting the metrological data, which is detrimental to the performance of the data transmissions, in particular in the case of communication networks that are potentially frequently disturbed, such as powerline communication (PLC) networks or radio communication networks, liable to be occasionally very noisy. The situation can be improved.

DISCLOSURE OF THE INVENTION

The aim of the invention is to improve the efficacy of a data transmission of the push type between a measuring device such as a smart electricity, water or gas consumption meter, for example, and a centralised collecting server device, by reducing the number of data to be transmitted, and by consequently achieving a substantial saving in bandwidth on the transmission link between these two items of equipment.

For this purpose, the object of the invention is a method for transmitting metrological data, implemented in a measuring device configured for converting a physical quantity into metrological data, the method comprising:
  detecting a modification of the configuration of said measuring device, in relation to metrological data to be transmitted,
  determining a series of information representing a transmission format of said metrological data to be transmitted,
  determining a hash code of said information representing said transmission format,
  sending, to a remote device, said hash code and then said metrological data to be transmitted.

The method according to the invention can also comprise the following features, considered alone or in combination:
  The physical quantity measured is an electrical energy consumption or a flow of a fluid (such as water or gas).
  The series of information representing a transmission format and said metrological data to be transmitted are organised according to a protocol or a set of DLMS/COSEM protocols for exchanging metering data, or one of the developments thereof.
  The hash code is determined by applying a hash function of the SHA-256 type to said series of information representing a transmission format.
    Another object of the invention is a measuring device configured for converting physical quantities into metrological data, the measuring device comprising electronic circuits configured for:
  detecting a modification of the configuration of said measuring device, in relation to metrological data to be transmitted,
  determining a series of information representing a transmission mode of said metrological data to be transmitted,
  determining a hash code of said information representing said transmission mode,
  sending, to a remote device, said hash code and then said metrological data to be transmitted.

According to one embodiment, the measuring device is of the type from: electricity consumption meter, water consumption meter, gas consumption meter.

Another object of the invention is a method for collecting metrological data, implemented in a server device for collecting metrological data, the collection method comprising:
  receiving, from a measuring device, a hash code representing a series of information representing a transmission format for metrological data to be received,
  successively comparing said hash code received with one or more hash codes previously received and stored in a memory of said collecting server device, and
  if the hash code received is identical to a hash code previously stored, determining, from information associated, in said memory, with said hash code stored, a format for data to be received, and otherwise,
  storing the hash code in said memory and obtaining, from said measuring device, and storing in said memory, in association with the hash code received, information representing a transmission format for metrological data to be received and used for generating the hash code.

The invention furthermore relates to a method for transmitting metrological data, implemented in a system for collecting metrological data, between a measuring device and a collecting server device, the method comprising the steps implemented by the measuring device:
  detecting a modification of the configuration of said measuring device, in relation to metrological data to be transmitted,
  determining a series of information representing a transmission format of said metrological data to be transmitted,
  determining a hash code of said information representing said transmission mode,
  sending, to a remote device, said hash code and then said metrological data to be transmitted,
  the method furthermore comprising the steps, performed by the collecting server device:
  receiving, from a measuring device, a hash code representing a series of information representing a transmission format for metrological data to be received,
  successively comparing said hash code received with one or more hash codes previously received and stored in a memory of said collecting server device, and
  if the hash code received is identical to a hash code previously stored, determining, from information associated, in said memory, with said hash code stored, a format for data to be received, and otherwise,
  storing the hash code in said memory and obtaining, from said measuring device, and storing in said memory, in association with the hash code received, information representing a transmission format for metrological data to be received and used for generating the hash code.

The invention also relates to a computer program product comprising program code instructions for performing the steps of one of the methods previously described when the program is executed by a processor, as well as an information storage medium comprising such a computer program product.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
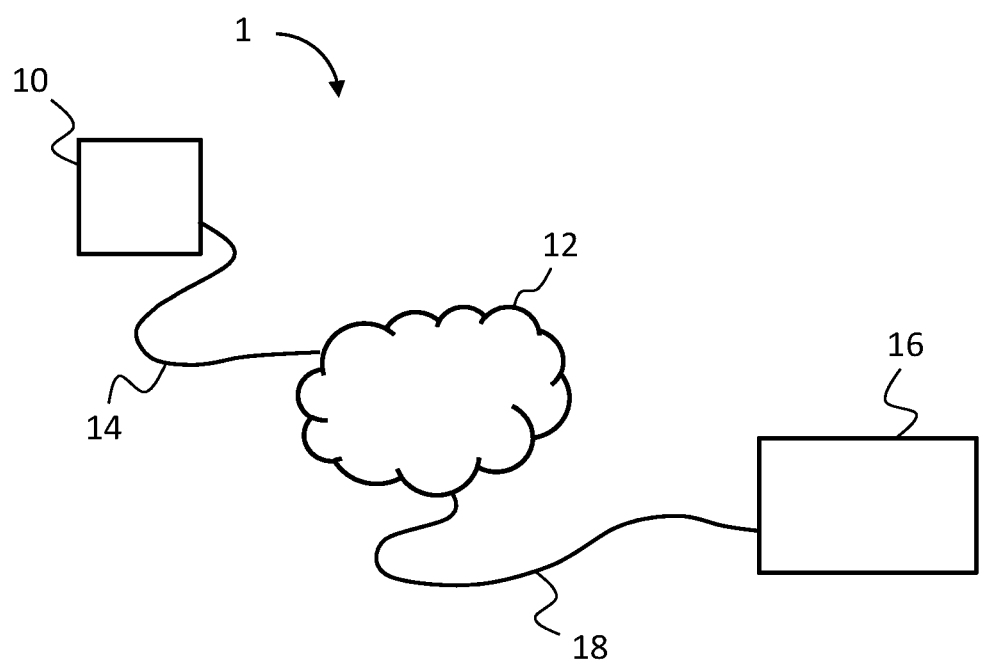
FIG. 1 illustrates a measuring device configured for transmitting metrological data to a collecting server, through a transmission system, according to one embodiment.

FIG. 1 illustrates schematically a system 1 for collecting metrological data. The system 1 for collecting metrological data comprises a measuring device 10. The measuring device 10 is a smart electrical energy consumption meter, also commonly referred to as a smart electricity meter or smart meter, configured for making electrical consumption measurements. According to the example described, the measuring device 10 is an electricity meter configured for measuring, at regular intervals, the electricity consumption of a dwelling and for transmitting, regularly to a collecting server, metrological data representing this consumption, classified according to predetermined criteria. For example, the measuring device 10 is configured for transmitting consumption data categorised according to a daytime tariff and consumption data categorised according to a night-time tariff. The system for collecting metrological data furthermore comprises a plurality of other measuring devices similar to the measuring device 10, possibly in a very large number. These are not shown on FIG. 1 for reasons of simplification of the description and because this is not useful to good understanding of the invention described here. The system 1 for collecting metrological data also comprises a collecting device 16, referred to as a collecting server, remote from the measuring devices of the system 1, and in particular remote from the measuring device 10. The measuring device 10 comprises a communication interface for communicating with the collecting server device 16 via a communication network 12. The measuring device 10 is connected to the communication network 12 via a cable link 14 and the collecting server device 16 is connected to the communication network 12 via a cable link 18. The collecting server device 16 also comprises a communication interface for connection thereof to the communication network 12. According to one embodiment of the invention, the communication network 12 is a mesh powerline communication network (referred to as a PLC network), for example of a type compatible with a set of physical supports and protocols defined according to the G3-PLC standard (ITU-T G9903 2017). Obviously, this example of a communication network is not limitative, and the invention can apply in the presence of another type of communication network used between the measuring device 10 and the collecting server device 16, such as, for example, a cellular radio network of the NB-IoT type.

The collecting server device 16 is configured for collecting metrological data measured by all or some of the measuring devices that are allocated to it, in terms of data management. According to the example described, the collecting server 16 operates as a single collecting device in the system 1 for collecting metrological data. According to variants, other collecting servers fulfilling identical, similar or complementary functions can be used.

According to one embodiment of the invention, the measuring device 10 can be configured for operating in various ways according to the collection requirements and the applications requesting a collection (monitoring of consumption, statistical analysis, invoicing, for example). For example, the measuring device 10 can be configured for implementing transmissions of metrological data in push mode, in pull mode, or by combining these two modes. According to another example, the measuring device 10 can be configured for implementing transmissions of metrological data in push mode once a day. According to a variant, the measuring device 10 can be configured for implementing a transmission of metrological data in push mode every hour, for example for the purpose of increased monitoring of the electrical consumption of a region in the event of excessively low temperatures, in a winter period. According to another example, the measuring device 10 can be configured for transmitting every hour, in push mode, to the collecting server device 16, metrological data representing daytime electrical consumptions and for transmitting only once every two days, still in push mode, and still to the collecting server 16, metrological data representing night-time electrical consumptions. Thus, when the measuring device 10 transmits metrological data to the collecting server device 16, the type and the form of the metrological data transmitted vary according to the configuration of the measuring device 10. According to one embodiment, the configuration or reconfiguration of the measuring device 10 can be implemented remotely, for example by an authorised person of an energy supply service. According to one embodiment, the measuring device 10 may furthermore be configured by a technical operator working on site and able to take control of the measuring device 10 locally, for example by means of a programming console connected to the measuring device 10 by a cable link or by a wireless link. According to one embodiment of the invention, a description of the type and form of the metrological data transmitted by the measuring device 10 is determined after an initial configuration or after each reconfiguration of the measuring device 10, according to a standardised protocol or according to a proprietary protocol. The description thus determined is called a description of the format of the metrological data to be transmitted, in the present description. This description comprises a series of information representing the format of the metrological data to be transmitted. This series of information is called metadata. According to one embodiment of the invention, the metadata comprise information fields indicating the nature of the data transmitted and their format in the broad sense. That is to say, when information is present in the metrological data, the metadata indicate to a receiver that interprets them where to find a data item in particular and what its form is (size, position, type of encoding, etc.). For example, metadata can be determined for indicating the presence of metrological data representing an active energy measurement and the presence of metrological data representing a reactive energy measurement. In a similar manner, the metadata can indicate that the metrological data comprise data relating to a measurement of energy imported to the dwelling or one of the data items relating to a measurement of energy produced in the precincts of the dwelling (in the electrical installation of the dwelling) and then exported to the network transporting and distributing electrical energy. Still according to a similar principle, the metadata can comprise information indicating the presence of data representing a consumption according to a first tariff, a consumption according to a second tariff, and the absence of data representing consumption according to a third tariff, this option not having been subscribed to by the subscriber to the electricity supply subscription. The metadata furthermore comprise information relating to the location and to the size of the useful data transmitted in all the data (in the block of data, or in a transmitted message).

Thus the metrological data transmitted from the measuring device 10 to the collecting server 16 are dependent on the configuration of the measuring device 10, and the metadata that aim to describe the structure and the format of the metrological data transmitted, for a receiver preparing to receive them or to read them, are also dependent on the configuration of the measuring device 10. According to one embodiment of the invention, the metadata and the metrological data are organised by the measuring device 10 in accordance with protocols defined according to the DLMS/COSEM (Bluebook V14) standard. The DLMS abbreviation comes from the English "Device Language Message Specification". The acronym COSEM comes from the English "Companion Specification for Energy Management". The DLMS/COSEM standard defines a set of protocols on which numerous applications involving multiserver smart meters using networks of the GPRS/UMTS/LTE and PLC type rely, for example, for transporting the metrological data in relation to varied applications. The data transmitted relate more broadly to energy consumptions, customer information, load switching operations, updating of firmware loaded in the meters, the management of events, etc. Advantageously, the metadata are updated automatically in the measuring device 10 to deal with a detection of change of configuration. A change of configuration is detected by a control module, internal or external to the measuring device 10, which scrutinises the configuration parameters particular to this measuring device.

Figure 2:
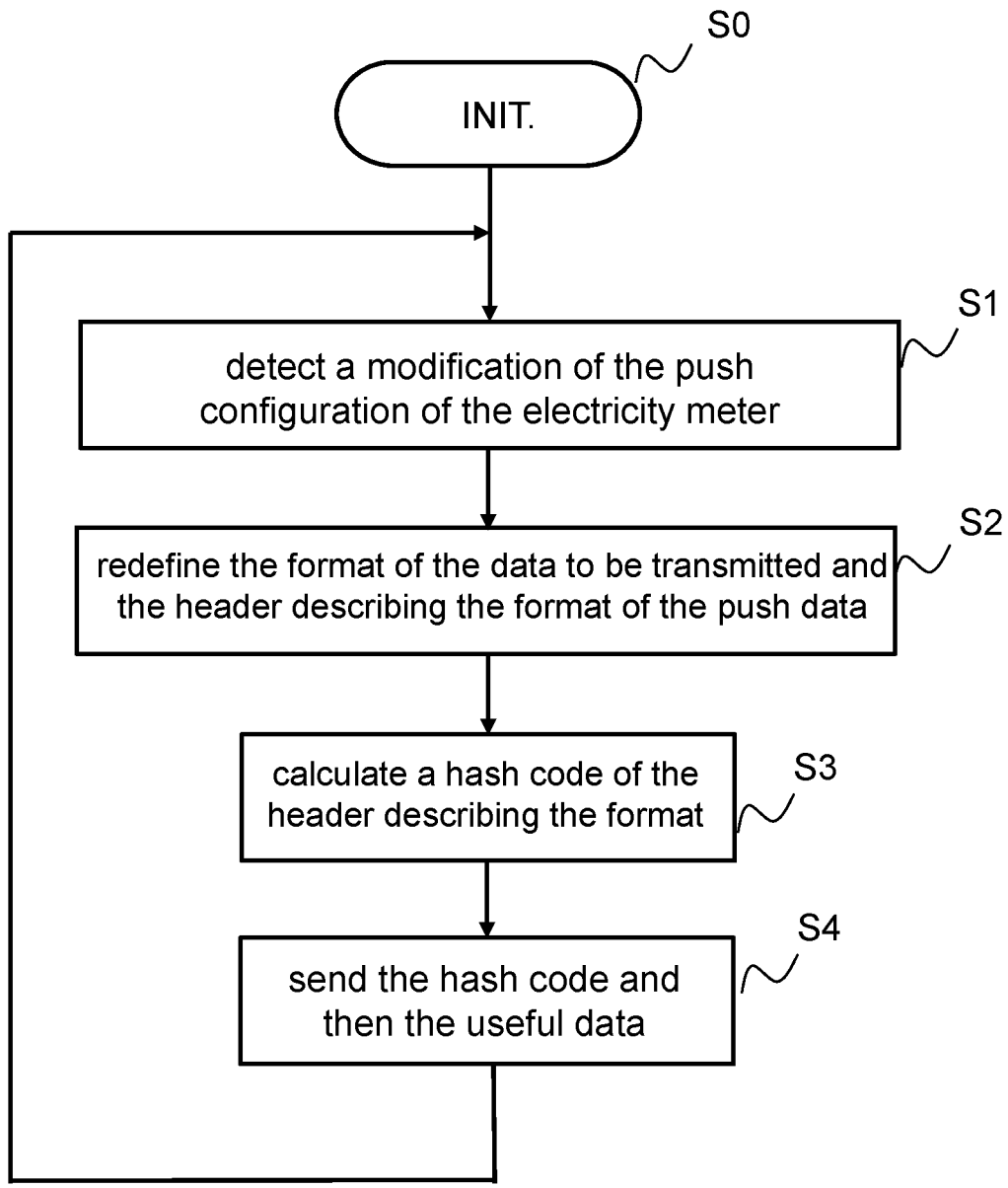
FIG. 2 is a flow diagram illustrating steps of a method for transmitting metrological data from the measuring device already shown on FIG. 1.

FIG. 2 illustrates a method for transmitting metrological data according to one embodiment, implemented in the measuring device 10, and which aims to cleverly replace the metadata, often much bulkier than the useful metrological data, by a hash code of these metadata, so as to limit the quantity of data to be transmitted.

This is because, though the transmissions of useful data are frequent between the measuring device 10 and the collecting server device 16, modifications of configuration are much less frequent. According to one example, metrological data are transmitted once a day between the measuring device 10 and the collecting server device 16, and a change of configuration of the measuring device 10 occurs only once to twice in the course of a year. Thus, seen from the side of receiver of metrological data, i.e. seen from the collecting server device 16, a single item of information representing the configuration, or in other words a single item of information representing the format and the organisation of the metrological data, may suffice, and it is then not necessary to transmit the bulky set of metadata. Cleverly, a hash code (or "hash") of the metadata is determined (calculated) so as to be unique for each possible variant configuration used. The term "hash code" designates here the result of a cryptographic hash function (H) applied to the metadata and valid as a description of the format of the metrological data to be transmitted. Thus the hash code cleverly acts as a unique digital fingerprint making it possible to quickly identify the initial data in the same way as a signature makes it possible to identify a person. The hash code determined represents a unique "key" of the metadata, without ever containing their envelope, and thus enables a receiver of the hash code to find the configuration of the sending measuring device, for example the configuration of the measuring device 10 and therefore the organisation and the format of the metadata that it transmits, and therefore of the metrological data that are received.

An initial step S0 corresponds to a step at the end of which the measuring device 10 is completely operational, has available metrological data to transmit to the remote collecting server device 16, metadata dependent in particular on the transmission configuration of the measuring device 10 and representing the organisation and the format of the metrological data to be transmitted, and is ready to implement a transmission of metadata and of metrological data to the remote collecting server 16.

In a step S1, a supervision module loaded in the measuring device 10, or external thereto, detects a modification of the configuration of the measuring device 10, said configuration modification impacting on the type and the form of the data to be transmitted in push mode to the collecting server 16. The format of the metrological data to be transmitted is therefore redefined in a step S2 because of the recent reconfiguration, and a header describing the format of the data to be transmitted in push mode is redefined accordingly. This header is none other than the set of metadata, a series of information representing the format of the useful metrological data, to be transmitted. In a step S3, a determination by calculation of a hash code (hash) representing the metadata is implemented by a control unit of the measuring device 10. According to one embodiment, a hash function of the SHA-256 type is applied to the metadata. According to variants, other hash functions can be used, such as, for example, an MD4 function, an MD5 function, an SHA-1 function, all well known in the cryptography field; these examples obviously not being limitative. After this, the hash code that results from the cryptographic hash operation is transmitted to the collecting server device 16, followed by the useful metrological data (electricity consumption data, for example).

Obviously, the metadata may comprise an identifier of the measuring device 10. Such an identifier may furthermore be transmitted outside the metadata, for example in a header independent of the messages between the measuring device 10 and the collecting server device 16.

Figure 3:
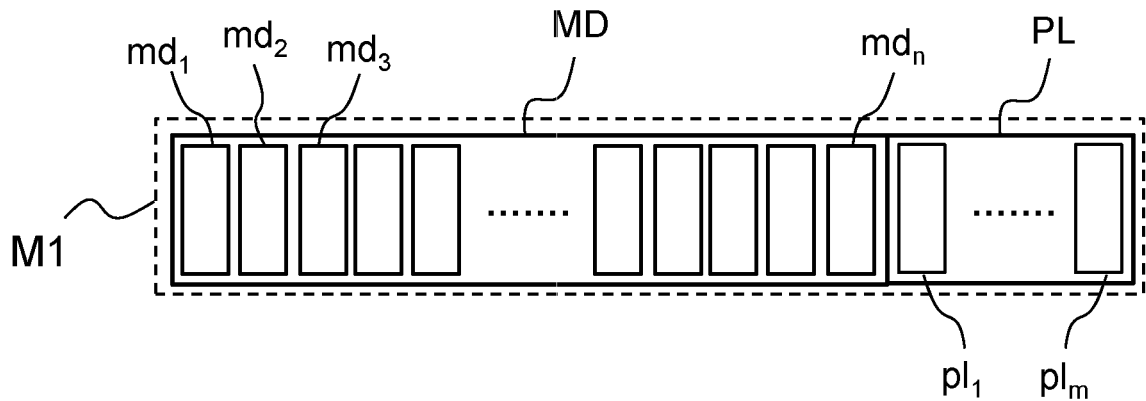
FIG. 3 illustrates the preparation of a message to be sent by the measuring device of FIG. 1, comprising metrological data, according to one embodiment.
Figure 3:
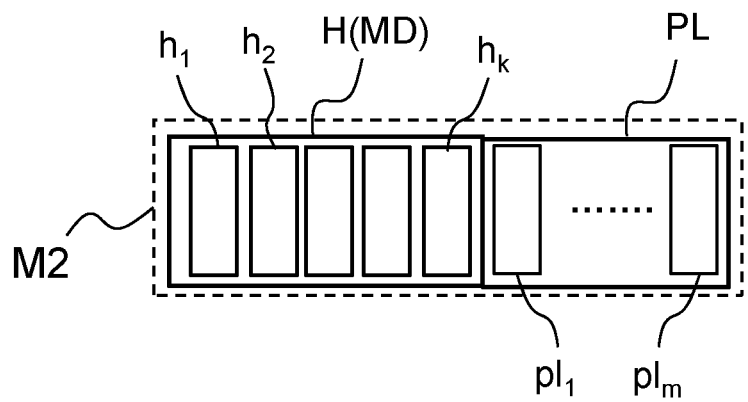

The top part of FIG. 3 illustrates a message M1 comprising a set MD of metadata and a set PL of useful metrological data, as transmitted according to the prior art, and the bottom part of FIG. 3 illustrates a message M2 comprising a hash code H(MD) of the set MD of metadata and comprising the set PL of useful metrological data. As symbolised in FIG. 3, the message M2 is obtained by applying the hash function H(MD) using the message M1. Advantageously, and by means of the direct use of an H(MD) hash code of the metadata MD in place of the metadata MD themselves, the length of the message M2 is much less than the length of the message M1. Advantageously and by means of the clever replacement of the metadata MD by a hash code of the metadata H(MD), a message M1 comprising more than a thousand bytes can be replaced by a message M2 comprising a little more than a hundred bytes. The saving in terms of bandwidth is therefore substantial. FIG. 3 furthermore illustrates details of the set MD of metadata. The set comprises a series $md_1$, $md_2$, $md_3$, . . . , $md_n$ of n metadata. In a similar manner, FIG. 3 illustrates that the set PL of useful metrological data (also sometimes referred to as "payload") comprises a series $pl_1$, $pl_2$, $pl_3$, . . . $pl_m$ of m useful metrological data. The detail of these metadata and data is not specified here since it does not participate in the understanding of the invention. The hash code H(MD) of the set MD of metadata comprises a series of data $md_1$, $md_2$, $md_3$, $md_k$, comprising a number k of signature data less than the number n of metadata. According to one embodiment, each of the metadata $md_1$ to $md_n$, each of the metrological data $pl_1$ to $pl_m$ and each of the signature data (or fingerprint data) $h_1$ to $h_k$ of the hash code H(MD) takes the form of a byte.

Figure 4:
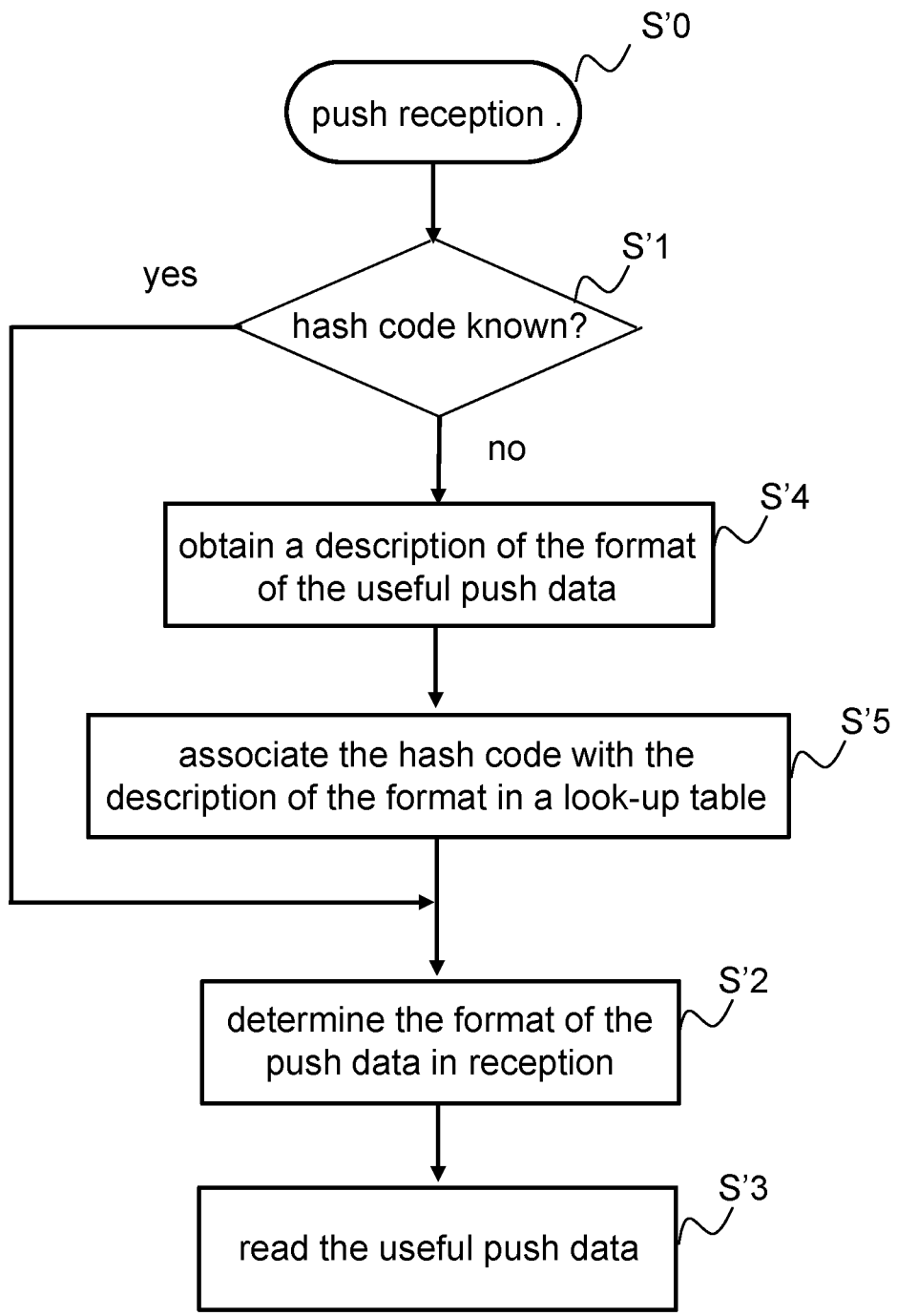
FIG. 4 is a flow diagram illustrating steps of a method for receiving metrological data received by the collecting server device already shown on FIG. 1.

FIG. 4 illustrates a method for receiving metrological data sent by the measuring device 10, implemented in the collecting server device 16, according to one embodiment. The collecting device 16 is designed and configured for receiving and storing the set PL of metrological data transmitted by the measuring device 10, as well as by many other measuring devices connected to the communication network 12 but not shown on FIG. 1. According to the example described, the collecting server device 16 is a remote device designed to make a collection of all the data measured by numerous measuring devices similar to the measuring device 10 and for then making these metrological data available to third-party systems with a view to one or more subsequent processing operations. For example, the collecting server device 16 may be configured to provide the collection and management of the metrological data from all the smart electricity consumption meters in a town, in a region or in a country. According to a variant, the collecting server device 16 may also perform all or some of subsequent processing operations to be implemented (classification, statistical analysis, breakdown, prediction, invoicing, etc.). Advantageously, the collecting server device 16 comprises a non-volatile memory provided for storing hash codes received in a lookup table associating, for each hash code value H(MD) different from each of the other hash code values previously received, a set MD of metadata, so that, for a given configuration of a measuring device already observed in reception by the collecting server device 16, a correspondence between hash code and set of metadata exists in the lookup table of the collecting server device 16.

A step S'0 corresponds to an initial step at the end of which the collecting server device 16 is normally operational and ready to receive, and receives, a message of the push type sent by the measuring device 10 or from a similar device of the collecting system 1, said method comprising a hash code H(MD) of a set MD of metadata followed by a set PL of useful metrological data. In a step S'1, the collecting server device 16 compares the hash code H(MD) received with, successively, each of the hash codes already received and present in its internal lookup table. If the comparison makes it possible to determine that the hash code received is already known to the collecting server device 16 (i.e., in other words, already present in its lookup table) then the collecting server 16 reads the set MD of metadata associated with the hash code H(MD) in its internal lookup table, in a step S'2, and can intelligibly read the useful data that were transmitted to it following the hash code H(MD) in a step S'3. If, on the other hand, the hash code H(MD) received at the step S'0 is not identified in the internal lookup table of the collecting server device 16, in the comparison step S'1, then the collecting server device 16 seeks the obtaining of a message comprising the set MD of metadata corresponding to the hash code H(MD) recently received and receives this set MD from the measuring device 10 in a step S'4. According to one embodiment, the collecting server device 16 seeks the obtaining of the set MD of metadata corresponding to the hash code H(MD) in accordance with a predefined protocol exchange, for example a dedicated request, and through the subsequent reception of a response to this request. According to a variant embodiment, the set MD may be sent to the collecting server device 16 when a new message is sent from the measuring device 10, said new message comprising both the hash code H(MD) and the set of data MD as well as optionally the useful metrological data, in the absence of a sending of an acknowledgement of reception sent by the collecting server device 16 within a granted extension following the initial transmission. Since the collecting server device 16 was able to obtain the description of the format of the useful push data, namely the metadata corresponding to the hash code that had not yet been recorded in its lookup table, it records and associates the hash code H(MD) with the set MD of metadata in its internal lookup table, then determines, in the step S'2, the format of the data to be read from the metadata received in the step S'4 and then, in the step S'3, performs a structured reading of the useful metrological data recently received.

It should be noted that, during a transmission of metrological data between the measuring device 10 and the collecting server device 16, the methods respectively described in relation to FIG. 2, implemented, in one case, in the measuring device 10, and in relation to FIG. 4, implemented, in the other case, in the collecting server device 16, are executed successively and correspond to sending operations followed by a reception operation. In this regard, the aforementioned methods constitute a method for transmitting metrological data implemented in the system 1 for transmitting metrological data and comprising:

detecting a modification of the configuration of the measuring device 10, in relation to metrological data PL to be transmitted to the collecting server device 16,
  determining metadata MD in the form of a series of information representing a format for transmitting the metrological data PL to be transmitted,
  determining a hash code H(MD) of said information MD representing the transmission format in relation to the configuration of the measuring device 10,
  sending, to the collecting server device 10, the hash code H(MD) and then the metrological data PL,
  receiving, by the collecting server device 16, from the measuring device 10, the hash code H(MD) representing the series of information representing the format for transmitting metrological data PL,
  successively comparing said hash code H(MD) received with one or more hash codes previously received and stored in a memory of the collecting server device 16, and
  if the hash code H(MD) received is identical to a hash code previously stored, determining, from information MD associated with said stored hash code, a format of data to be received, and otherwise storing the hash code H(MD) in the memory of the collecting server device 16, obtaining from the measuring device 10 and storing in the memory, in association with the hash code H(MD) received, information MD representing the format for transmitting metrological data PL that was used for generating the hash code H(MD).

Figure 5:
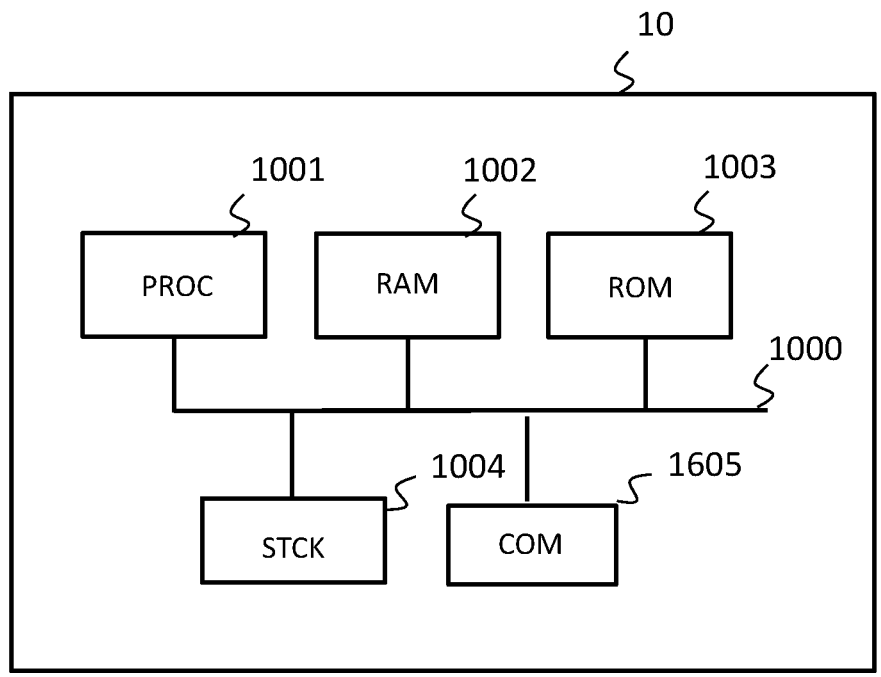
FIG. 5 is an outline diagram illustrating an architecture of a measuring device configured for sending metrological data according to one embodiment.

FIG. 5 illustrates schematically an example of internal architecture of the measuring device 10. We consider by way of illustration that FIG. 5 illustrates an internal arrangement of the measuring device 10. According to the example of hardware architecture shown in FIG. 5, the measuring device 10 then comprises, connected by a communication bus 1000: a processor or CPU (central processing unit) 1001; a random access memory RAM 1002; a read only memory ROM 1003; a storage unit such as a hard disk (or a storage medium reader, such as an SD (Secure Digital) card reader) 1004; at least one communication interface 1005 enabling the measuring device 10 to communicate with other devices present in the communication network 12, such as other measuring devices implementing communication relay functions, for example, or more broadly devices for communicating by communication network.

The processor 1001 is capable of implementing instructions loaded in the RAM 1002 from the ROM 1003, from an external memory (not shown), from a storage medium (such as an SD card), or from a communication network. When the measuring device 10 is powered up, the processor 1001 is capable of reading instructions from the RAM 1002 and implementing them. These instructions form a computer program causing the implementation, by the processor 1001, of all or part of a method described in relation to FIG. 2 or of described variants of this method.

All or some of the methods described in relation to FIG. 2 or described variants thereof can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the measuring device 10 comprises electronic circuitry configured for implementing the methods described in relation to the measuring device 10. Obviously the measuring device 10 furthermore comprises all the elements usually present in a system comprising a control unit and its peripherals, such as a power supply circuit, a power supply monitoring circuit, one or more clock circuits, a reset circuit, input-output ports, interrupt inputs, and bus drivers. This list being non-exhaustive.

Figure 6:
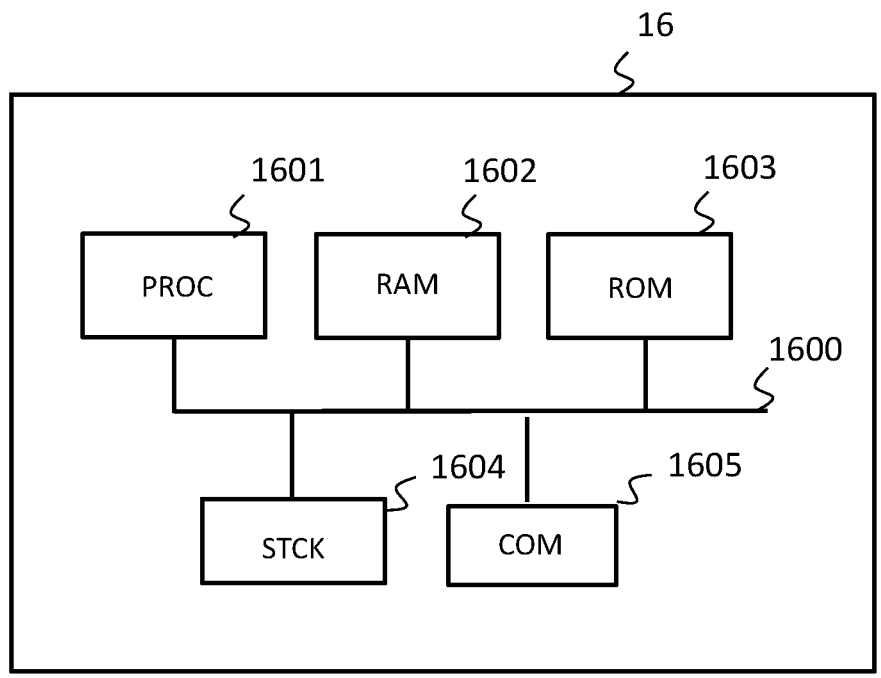
FIG. 6 is an outline diagram illustrating an architecture of a collecting server device configured for sending metrological data according to one embodiment.

FIG. 6 illustrates schematically an example of internal architecture of the collecting server device 16. We consider by way of illustration that FIG. 6 illustrates an internal arrangement of the collecting server device 16. According to the example of hardware architecture shown in FIG. 6, the collecting server device 16 then comprises, connected by a communication bus 1600: a processor or CPU (central processing unit) 1601; a random access memory RAM 1602; a read only memory ROM 1603; a storage unit such as a hard disk (or a storage medium reader, such as an SD (Secure Digital) card reader) 1604; at least one communication interface 1605 enabling the collecting server device 16 to communicate with other devices present in the communication network 12, such as other measuring devices implementing communication relay functions, for example, or more broadly devices for communicating by communication network.

The processor 1601 is capable of implementing instructions loaded in the RAM 1602 from the ROM 1603, from an external memory (not shown), from a storage medium (such as an SD card), or from a communication network. When the collecting server device 16 is powered up, the processor 1601 is capable of reading instructions from the RAM 1602 and implementing them. These instructions form a computer program causing the implementation, by the processor 1601, of all or part of a method described in relation to FIG. 4 or described variants of this method.

All or some of the methods described in relation to FIG. 4 or described variants thereof can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the collecting server device 16 comprises electronic circuitry configured for implementing the methods described in relation to the collecting server device 16. Obviously, the collecting server device 16 furthermore comprises all the elements usually present in a system comprising a control unit and its peripherals, such as a power supply circuit, a power supply monitoring circuit, one or more clock circuits, a reset circuit, input-output ports, interrupt inputs, and bus drivers. This list being non-exhaustive.

The invention is not limited solely to the embodiments and examples described but relates more broadly to any method for transmitting data between a measuring device supplying metrological data and a device for collecting these data, wherein metadata intended to indicate to the collecting device the format of the useful data are replaced by a hash code of these metadata before transmission, as well as a device configured for implementing such a method.

The invention claimed is:

1. A method for transmitting metrological data, implemented in a flow measuring device configured for converting a physical flow quantity into metrological data to be transmitted to a collecting server, the method comprising:
   detecting a modification of the configuration of said flow measuring device, in relation to metrological data to be transmitted,
   determining a series of information representing a transmission format of said metrological data to be transmitted,
   determining a hash code of said information representing said transmission format,
   sending, to said collecting server, said hash code representing said transmission format and then said metrological data to be transmitted.

2. The method for transmitting metrological data according to claim 1, wherein the physical flow quantity is an electrical consumption or a flow of a fluid.

3. The method for transmitting metrological data according to claim 1, wherein said series of information representing a transmission format and said metrological data to be transmitted are organised according to a protocol or a set of DLMS/COSEM protocols for exchanging metering data, or one of the developments thereof.

4. The method for transmitting metrological data according to claim 1, wherein said hash code is determined by applying a hash function of the SHA-256 type to said series of information representing a transmission format.

5. A measuring device configured for converting physical flow quantities into metrological data to be transmitted to a collecting server, the measuring device comprising electronic circuits configured for:
   detecting a modification of the configuration of said flow measuring device, in relation to metrological data to be transmitted,
   determining a series of information representing a transmission mode of said metrological data to be transmitted,
   determining a hash code of said information representing said transmission mode,
   sending, to said collecting server, said hash code and then said metrological data to be transmitted.

6. The measuring device configured according to claim 5, the device being of the type from: electricity consumption meter, water consumption meter, gas consumption meter.

7. A method for collecting metrological data, implemented in a server device for collecting metrological data to be transmitted to a collecting server, the collection method comprising:
   receiving, from a measuring device, a hash code representing a series of information representing a transmission format for metrological data to be received,
   successively comparing said hash code received with one or more hash codes previously received and stored in a memory of said collecting server device, and
   if the hash code received is identical to a hash code previously stored, determining, from information associated, in said memory, with said hash code stored, a format for data to be received, and otherwise,
   storing the hash code in said memory and obtaining, from said measuring device, and storing in said memory, in association with the hash code received, information representing a transmission format for metrological data to be received and used for generating the hash code.

8. A method for transmitting metrological data, implemented in a system for collecting metrological data, between a measuring device and a collecting server device, the method comprising the steps implemented by the measuring device:
   detecting a modification of the configuration of said measuring device, in relation to metrological data to be transmitted,
   determining a series of information representing a transmission format of said metrological data to be transmitted,
   determining a hash code of said information representing said transmission mode,
   sending, to a remote device, said hash code and then said metrological data to be transmitted,
   the method furthermore comprising the steps, performed by the collecting server device:
   receiving, from a measuring device, a hash code representing a series of information representing a transmission format for metrological data to be received,
   successively comparing said hash code received with one or more hash codes previously received and stored in a memory of said collecting server device, and
   if the hash code received is identical to a hash code previously stored, determining, from information associated with said hash code stored, a format for data to be received, and otherwise,
   storing the hash code in said memory, obtaining, from said measuring device, and storing in said memory, in association with the hash code received, information representing a transmission format for metrological data to be received and used for generating the hash code.

9. A non-transitory storage medium comprising a computer program product that comprises program code instructions for performing steps of the method according to claim 1, when said program is executed by a processor.

* * * * *